(12) United States Patent
Portney et al.

(10) Patent No.: US 10,112,541 B2
(45) Date of Patent: Oct. 30, 2018

(54) LOW-FLOOR DROP FRAME FOR PASSENGER TRANSPORT VEHICLE

(71) Applicant: Champion Bus, Inc., Imlay City, MI (US)

(72) Inventors: Robert Portney, Lake Orion, MI (US); James Scott, Lapeer, MI (US); John Resnik, Metamora, MI (US)

(73) Assignee: Champion Bus, Inc., Imlay City, MI (US)

( * ) Notice: Subject to any disclaimer, the term of this patent is extended or adjusted under 35 U.S.C. 154(b) by 348 days.

(21) Appl. No.: 15/048,557

(22) Filed: Feb. 19, 2016

(65) Prior Publication Data

US 2016/0243990 A1 Aug. 25, 2016

Related U.S. Application Data

(60) Provisional application No. 62/118,969, filed on Feb. 20, 2015.

(51) Int. Cl.
*B62D 21/02* (2006.01)
*B62D 21/18* (2006.01)
(Continued)

(52) U.S. Cl.
CPC .............. *B60R 3/00* (2013.01); *B62D 21/02* (2013.01); *B62D 21/18* (2013.01); *B62D 47/02* (2013.01); *B62D 65/16* (2013.01); *B62D 31/025* (2013.01)

(58) Field of Classification Search
CPC ........ B62D 21/02; B62D 21/18; B62D 33/02; B62D 47/02; B62D 47/003; B62D 65/16;
(Continued)

(56) References Cited

U.S. PATENT DOCUMENTS 1,475,328 A * 11/1923 Wales .................... B62D 21/02
280/783
1,638,948 A * 8/1927 Masury .................. B62D 21/02
280/796
(Continued)

FOREIGN PATENT DOCUMENTS

EP 2495115 A1 9/2012
JP 11348834 12/1999
(Continued)

OTHER PUBLICATIONS

Search Report and Written Opinion dated May 11, 2016 for related PCT Patent Application No. PCT/US2016/018713, 15 pages.
(Continued)

*Primary Examiner* — Gregory A Blankenship
(74) *Attorney, Agent, or Firm* — Hovey Williams LLP

(57) ABSTRACT

A vehicle for transporting passengers. The vehicle comprises a chassis including a front axle, a rear axle, and a frame that includes a front section that supports the front axle and a rear section that supports the rear axle. The vehicle further comprises a drop frame insert located between the front section of the frame and the rear section of the frame. A top surface of the drop frame insert is positioned lower than a top surface of the frame, and at least a portion of a bottom surface of the drop frame insert is generally coplanar with a bottom surface of the frame.

20 Claims, 11 Drawing Sheets

(51) Int. Cl.
  *B62D 25/20* (2006.01)
  *B62D 47/02* (2006.01)
  *B62D 65/16* (2006.01)
  *B62D 31/02* (2006.01)
  *B60R 3/00* (2006.01)
(58) Field of Classification Search
  CPC ...... B62D 31/02; B62D 31/025; B62D 25/20;
                                  B62D 65/02; B60R 3/00
  USPC ........................................................ 296/178
  See application file for complete search history.

(56) References Cited

U.S. PATENT DOCUMENTS

| | | | |
|---|---|---|---|
| 2,794,650 A * | 6/1957 | Schilberg | B62D 21/18 |
| | | | 280/2 |
| 3,628,209 A | 12/1971 | Parent | |
| 3,807,758 A | 4/1974 | Rogge | |
| 4,131,209 A | 12/1978 | Manning | |
| 4,180,366 A | 12/1979 | Roth et al. | |
| 4,185,849 A | 1/1980 | Jaeger | |
| 4,231,144 A * | 11/1980 | Bernacchia, Jr. | B60P 3/423 |
| | | | 29/401.1 |
| 4,339,224 A | 7/1982 | Lamb | |
| 4,559,659 A | 12/1985 | Hunter, Jr. | |
| 4,759,682 A | 7/1988 | Hood | |
| 4,863,189 A | 9/1989 | Lindsay | |
| 5,033,567 A | 7/1991 | Washburn et al. | |
| 5,066,067 A | 11/1991 | Ferdows | |
| 5,160,236 A | 11/1992 | Redding | |
| 5,577,793 A | 11/1996 | Kobasic | |
| 5,676,515 A | 10/1997 | Haustein | |
| 5,775,232 A | 7/1998 | Golemis et al. | |
| 6,095,747 A | 8/2000 | Cohn | |
| 6,179,545 B1 | 1/2001 | Petersen et al. | |
| 6,186,733 B1 | 2/2001 | Lewis et al. | |
| 6,203,265 B1 | 3/2001 | Cohn et al. | |
| 7,044,504 B2 | 5/2006 | Studebaker et al. | |
| 7,559,578 B2 | 7/2009 | va Leeve et al. | |
| 7,802,801 B2 | 9/2010 | Bartel et al. | |
| 7,908,976 B2 | 3/2011 | Pujol | |
| 8,371,589 B2 | 2/2013 | Bartel et al. | |
| 8,888,135 B1 | 11/2014 | Reitnouer | |
| 8,936,275 B2 | 1/2015 | Kane et al. | |
| 8,967,669 B2 | 3/2015 | Kane et al. | |
| 9,101,519 B2 | 8/2015 | Smith et al. | |
| 10,023,243 B2 * | 7/2018 | Hines | B62D 31/02 |
| 2004/0148778 A1 | 8/2004 | Fleming | |
| 2005/0110263 A1 * | 5/2005 | Rini | B62D 21/02 |
| | | | 280/781 |
| 2005/0161975 A1 * | 7/2005 | Nieminski | B62D 31/025 |
| | | | 296/178 |
| 2005/0227539 A1 * | 10/2005 | Timmermans | B62D 31/02 |
| | | | 439/607.41 |
| 2005/0263987 A1 * | 12/2005 | Smith | B60G 3/14 |
| | | | 280/683 |
| 2006/0108784 A1 * | 5/2006 | Van Der Bijl | B62D 21/02 |
| | | | 280/800 |
| 2006/0151229 A1 * | 7/2006 | Leeve | B60K 13/04 |
| | | | 180/296 |
| 2006/0245883 A1 | 11/2006 | Fontaine et al. | |
| 2008/0067796 A1 * | 3/2008 | Pitsenbarger | B62D 21/02 |
| | | | 280/790 |
| 2009/0085370 A1 * | 4/2009 | Bartel | A61G 3/061 |
| | | | 296/178 |
| 2009/0195015 A1 | 8/2009 | Kerr et al. | |
| 2010/0178143 A1 | 7/2010 | Smith | |
| 2010/0219663 A1 * | 9/2010 | Levin | B23K 9/013 |
| | | | 296/204 |
| 2011/0035104 A1 | 2/2011 | Smith | |
| 2011/0068566 A1 * | 3/2011 | Bartel | A61G 3/061 |
| | | | 280/788 |
| 2011/0121554 A1 | 5/2011 | Olson et al. | |
| 2012/0161469 A1 | 6/2012 | Kerr et al. | |
| 2013/0330157 A1 | 12/2013 | Asztalos et al. | |
| 2014/0049033 A1 | 2/2014 | Yee et al. | |
| 2014/0062043 A1 * | 3/2014 | Boterdaele | B62D 47/02 |
| | | | 280/81.6 |
| 2014/0219756 A1 | 8/2014 | Smith et al. | |
| 2014/0346763 A1 * | 11/2014 | Kane | A61G 3/061 |
| | | | 280/790 |
| 2015/0197130 A1 | 7/2015 | Smith et al. | |
| 2016/0090134 A1 * | 3/2016 | Niu | B62D 21/18 |
| | | | 180/22 |
| 2016/0243990 A1 * | 8/2016 | Portney | B60R 3/00 |
| 2017/0137079 A1 * | 5/2017 | D'Urso | B62D 65/00 |
| 2017/0216112 A1 * | 8/2017 | Hines | B62D 31/02 |
| 2017/0240215 A1 * | 8/2017 | LaRose | B62D 31/025 |
| 2018/0057058 A1 * | 3/2018 | Tyan | B62D 21/02 |
| 2018/0093727 A1 * | 4/2018 | Cox | B62D 65/02 |

FOREIGN PATENT DOCUMENTS

| | | |
|---|---|---|
| JP | 2000219147 | 8/2000 |
| JP | 2001180534 | 7/2001 |
| JP | 2003212146 | 7/2003 |
| JP | 2003293537 | 10/2003 |
| KR | 100290036 | 5/2001 |
| WO | 02092414 A1 | 11/2002 |

OTHER PUBLICATIONS

International Search Report and Written Opinion dated Sep. 24, 2014 for related PCT Application No. PCT/US2014/039604; 9 pages.

International Search Report and Written Opinion dated Sep. 24, 2014 for related PCT Application No. PCT/US2014/039603; 10 pages.

* cited by examiner

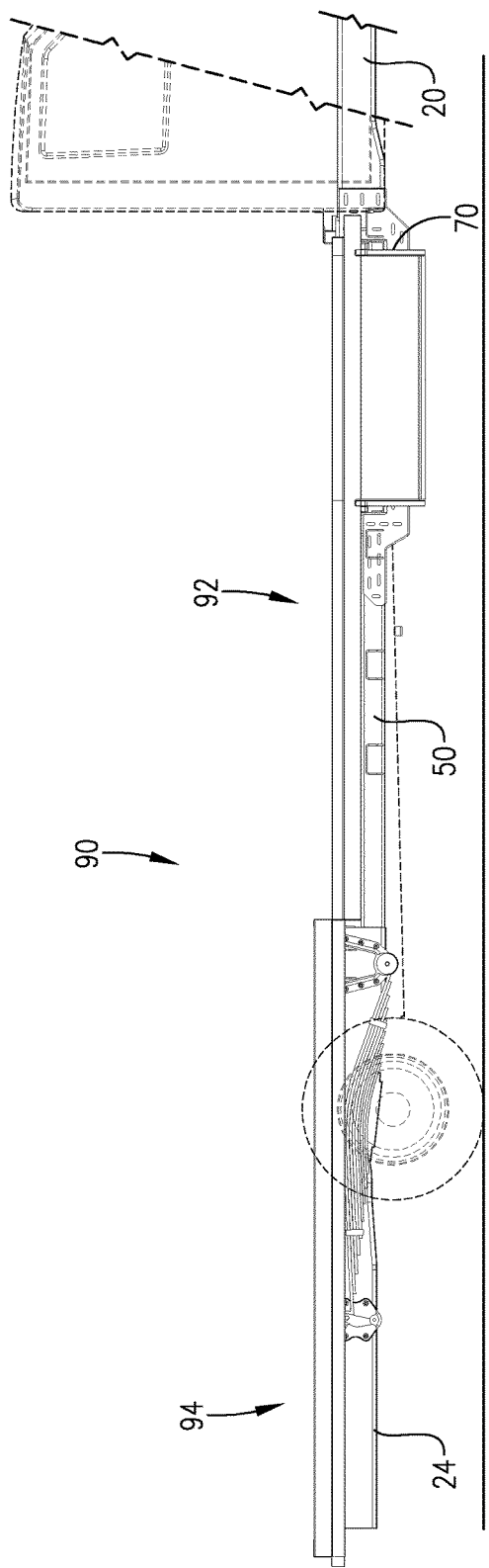
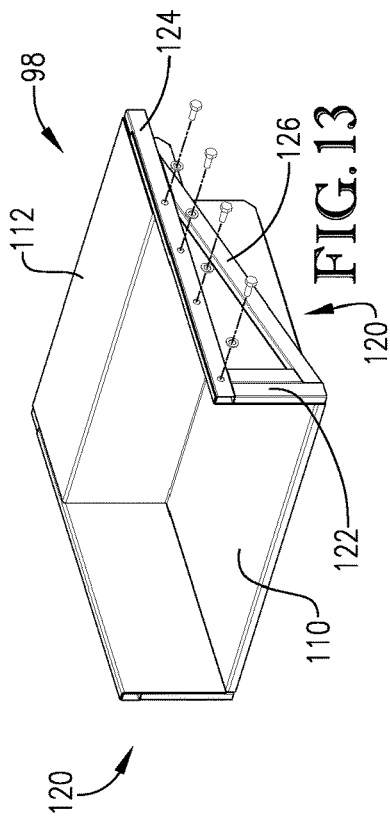

LOW-FLOOR DROP FRAME FOR PASSENGER TRANSPORT VEHICLE

CROSS REFERENCE TO RELATED APPLICATIONS

This non-provisional patent application claims priority benefit to U.S. Provisional Patent Application Ser. No. 62/118,969, entitled "LOW FLOOR SHUTTLE," filed Feb. 20, 2015, the entirety of which is incorporated herein by reference.

FIELD

Embodiments of the present invention generally relate to vehicles for transporting passengers and, more specifically, to a low-floor drop frame for modifying such vehicles from a high-profile configuration to low-profile configuration.

BACKGROUND

Certain vehicles such as, for example, vans, shuttles, busses, and the like, can be utilized to transport multiple passengers. Such vehicles can be produced and sold by an original equipment manufacturer (OEM). Alternatively, an OEM can manufacture and sell a chassis that includes a driver's cab, a frame, and other rolling components (e.g., drivetrain, axles, wheels, and the like). The OEM chassis can be sold to an intermediary that can modify the OEM chassis and/or add components to the OEM chassis to produce a modified vehicle, such as a shuttle, which is capable of efficiently transporting passengers. For example, an OEM chassis can be modified by an intermediary that performs frame modifications, such as stretching the vehicle wheelbase and/or lowering the vehicle frame. In some instances, a passenger cabin ("cab") can be integrated with the modified vehicle, such that the vehicle can be resold as a shuttle or a bus.

As noted above, it may be required that the OEM chassis or chassis frame be modified from a high-profile configuration to a low-profile configuration such that the passenger cab of the vehicle can accommodate the loading and unloading (i.e., ingress and egress) of passengers. Such a lowering of the chassis is particularly necessary to accommodate passengers with disabilities, such as persons requiring the use of wheelchairs. Nevertheless, it can be quite costly to design and fabricate such modifications for OEM chassis. For instance, OEM chassis are typically fabricated from high strength steel. Specifically, OEM chassis often comprise ladder frames that include a pair of opposing channel rails that extend the entire length of the vehicle. Such ladder frames are generally situated in a high-profile configuration, which thereby correspond to a high position of the OEM vehicle's passenger cab. To facilitate a lowering of the passenger cab of the OEM to a level required to accommodate the loading and unloading of passengers, significant modifications to the ladder frames and to the chassis in general is often required. A significant problem with modifying such heavy-duty, high-profile, ladder frame chassis is that in addition to the substantial effort and cost required, such modifications can result in significant compromises to the modified vehicle's strength.

Accordingly, a need exists for a method and system for converting a high-profile OEM vehicle to a low-profile vehicle that accommodates loading and unloading of passengers. Furthermore there is a need to provide a method and system that allows such modifications to be performed at a reasonable cost and in a manner that maintains the strength of the vehicle.

SUMMARY

Embodiments of the present invention include a vehicle for transporting passengers. The vehicle comprises a chassis including a front axle, a rear axle, and a frame that includes a front section that supports the front axle and a rear section that supports the rear axle. The vehicle further comprises a drop frame insert located between the front section of the frame and the rear section of the frame. A top surface of the drop frame insert is positioned lower than a top surface of the frame, and at least a portion of a bottom surface of the drop frame insert is generally coplanar with a bottom surface of the frame.

Embodiments of the present invention additionally include a frame insert for a passenger transport vehicle, with the passenger transport vehicle including a chassis comprising a front axle, a rear axle, and a frame that supports the front axle and the rear axle. The frame insert comprises a longitudinally-extending left rail and a longitudinally-extending right rail, with the left rail and the right rail being spaced apart and extending in generally parallel relationship. The frame insert additionally comprises one or more lateral cross members extending between the left rail and the right rail. The frame insert additionally comprises a reinforcement assembly positioned at a rear end of each of the left rail and the right rail, with the reinforcement assemblies being configured to be at least partially received in channels presented by the chassis frame. The frame insert further includes an extended drop section extending forward from the right rail, with the extended drop section being positioned lower than the right rail.

Embodiments of the present invention further include a method for modifying an original equipment manufacturer (OEM) vehicle from a high-profile configuration to a low-profile configuration. The OEM vehicle comprises an OEM chassis that includes a front axle, a rear axle, and an OEM frame that supports the front axle and the rear axle. The OEM frame includes an OEM left rail and an OEM right rail. The method comprises the initial step of cutting the OEM right rail (i) rearward of the front axle of the vehicle chassis and (ii) forward of the rear axle of the vehicle chassis. The cuts are formed such that a central section of the OEM right rail is removable from remaining portions of the OEM frame. The method includes an additional step of cutting the OEM left rail (i) rearward of the front axle of the vehicle chassis and (ii) forward of the rear axle of the vehicle chassis. The cuts are formed such that a central section of the OEM left rail is removable from remaining portions of the OEM frame. The method includes the additional step of engaging a drop frame insert with the remaining portions of the OEM frame, with the drop frame insert extending between the front axle and the rear axle of the vehicle. The method includes the additional step of rigidly securing the drop frame insert in place with respect to the remaining portions of the OEM frame. Upon rigidly securing drop frame insert in place, a top surface of the drop frame insert is positioned lower than a top surface of the OEM frame, and at least a portion of a bottom surface of the drop frame insert is generally coplanar with a bottom surface of the OEM frame This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein:

FIG. 11 is a partial right side elevation view of the vehicle, the drop frame insert, and the subfloor assembly from FIG. 10;

FIG. 13 is a perspective view of a platform insert configured to be removably secured with a subfloor assembly according to embodiments of the present invention.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
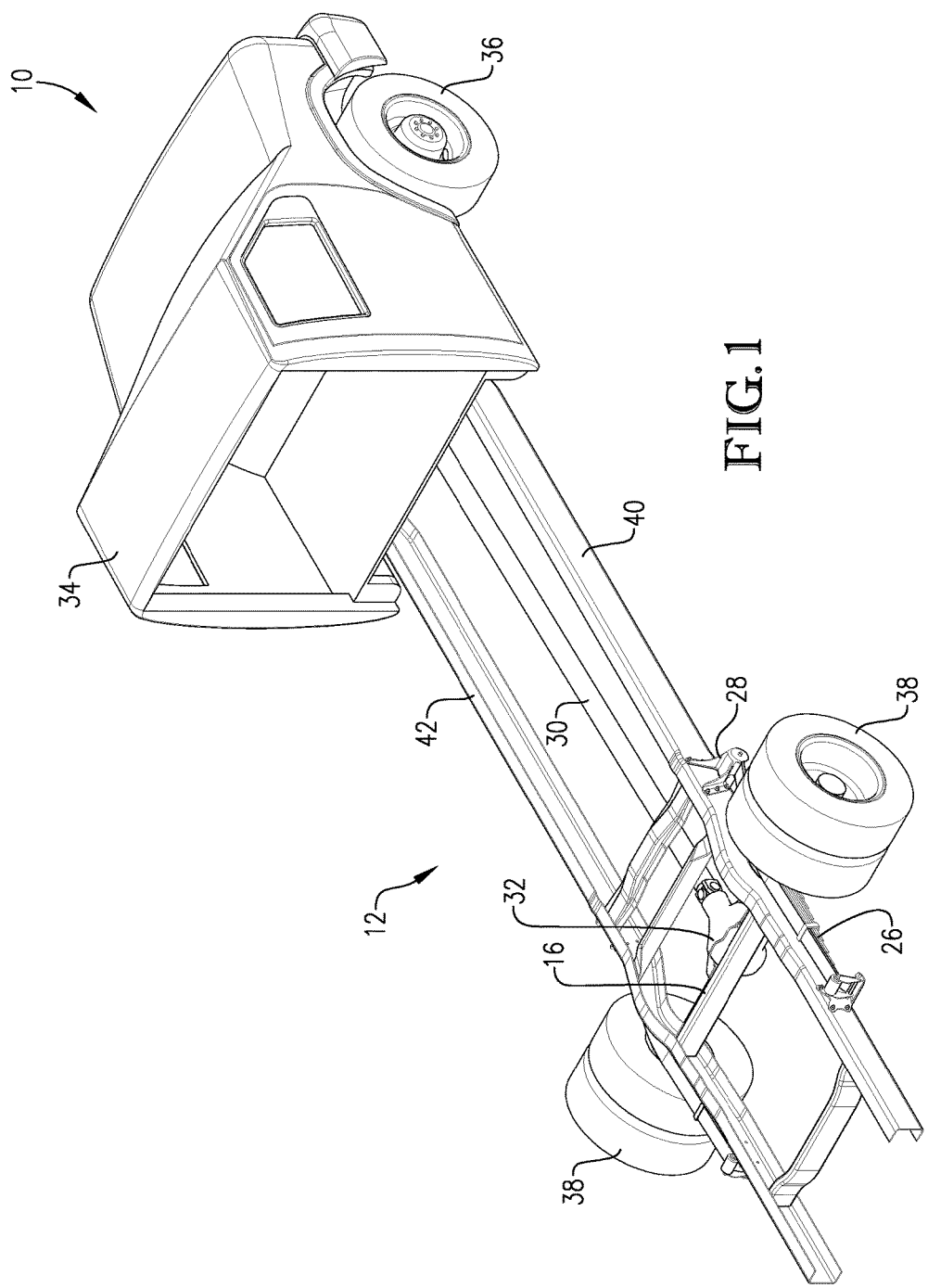
FIG. 1 is a right side rear perspective view of an original equipment manufacturer vehicle, particularly showing components of a chassis of the vehicle.

Embodiments of the present invention are directed to a system and method for modifying a vehicle chassis from a high-profile configuration to a low-profile configuration. As shown in FIG. 1, the vehicle may be an OEM vehicle 10 such as a Ford F350, F450, F550, E350, E450, or the like. However, it should be understood that the particular manufacturer and model of the OEM vehicle 10 is by way of example only, and is not limiting on any embodiment of the present invention. For instance, the vehicle 10 may be a Chevrolet, Dodge, Toyota, or the like. As used herein, the terms "right" and "left" pertain to the right side (i.e., passenger side) and left side (i.e., driver side), respectively, of the vehicle 10. Also, the terms "front" or "forward" refer to a direction from the rear wheels of the vehicle 10 toward the front wheels of the vehicle 10, while the terms "back," "rear," or "rearward" refer to a direction from the front wheels of the vehicle 10 toward the rear wheels of the vehicle 10. Similarly, the terms "upward" or "higher" refer to a direction from a ground surface towards the vehicle 10, while the terms "downward" or "lower" refer to a direction from the vehicle 10 towards the ground surface. Finally, the terms "inward" or "inboard" refer to a direction towards a longitudinal centerline the vehicle 10, while the terms "outward" or "outboard" refer to a direction away from the longitudinal centerline of the vehicle 10.

Figure 2:
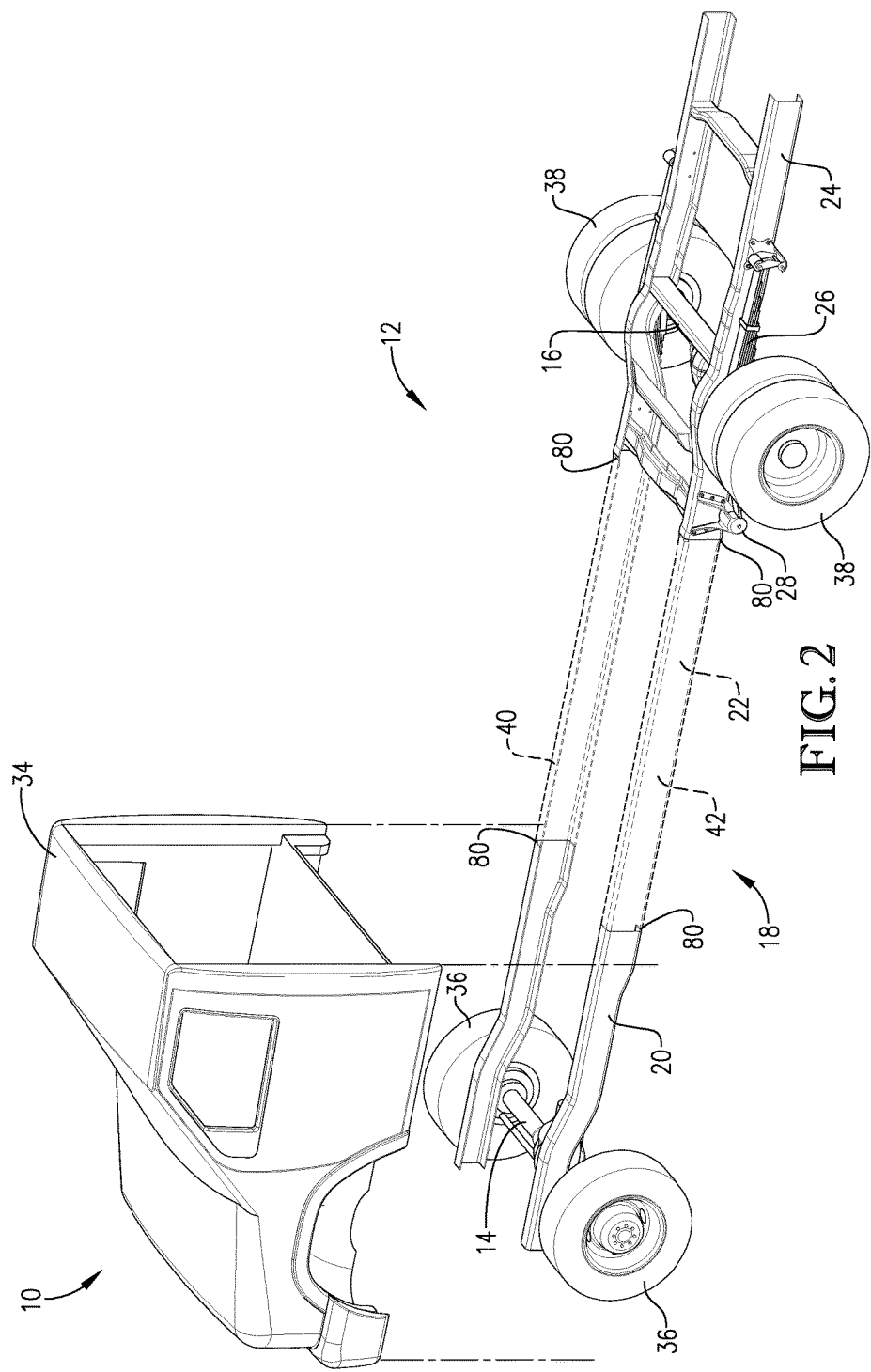
FIG. 2 is partially exploded left side perspective view of the vehicle from FIG. 1, particularly showing a frame of the vehicle chassis, with a central section of the frame shown in dotted line.

With reference to FIG. 2, the vehicle 10 may include an OEM chassis 12 that comprises a front axle 14, a rear axle 16, and OEM frame 18 (hereinafter, "OEM frame") with a front section 20, a central section 22, and a rear section 24. The axles 14, 16 are generally configured to transmit driving torque to the wheels of the vehicle. In addition, the chassis 12 may include various types of suspension elements, such as spring suspension elements, hydraulic elements, air suspension elements, or the like. For instance, the rear axle 16 and the rear wheels may be connected to the OEM frame 18 by way of leaf springs 26, which are positioned on each side of the OEM frame 18 (See FIGS. 1 and 2). Specifically, the leaf springs 26 may be connected to the rear axle 16 and also to the OEM frame 18 by one or more spring hangers 28, in the form of brackets. It is noted that, the OEM chassis 12 can include and/or support additional components for operation of the vehicle such as, for example, engine (not shown), transmission (not shown), driveshaft 30 (See FIG. 1), differential 32 (See FIG. 1), and the like.

Turning to the OEM frame 18 in more detail, as shown in FIG. 2, the front section 20 may extend from a front end of the vehicle 10 and may be configured to support a driver cab 34, which can house an operator, operator controls, and the engine and transmission of the vehicle 10. In addition, the front section 20 may support the front axle 14 and may be supported on the ground by a pair of steerable front wheels 36. The OEM frame 18 may additionally include the central section 22, which extends rearward from the front section 20 (i.e., rearward of the driver cab 34) to the rear section 24. The rear section 24 of the OEM frame may extend from the central section 22 to a rear end of the vehicle 10. The rear section 24 may support the rear axle 16 and may be supported on the ground by a two or more non-steerable rear wheels 38.

As illustrated in FIGS. 1-2, the OEM frame 18 may be comprised of a right longitudinal OEM rail 40 and left longitudinal OEM rail 42 that extend from the front end of the vehicle 10 to the rear end of the vehicle 10. The right and left OEM rails 40, 42 are generally straight and extend in a generally parallel relationship from over the front axle 14 to over the rear axle 16 of the vehicle 10. In certain embodiments, the right and left OEM rails 40, 42 may be formed as channel members that have a C-shaped cross section. Nevertheless, the OEM rails can have other configurations, such as open-C channels, closed cross-sectional channels, I-shaped cross sections, and the like. In embodiments in which the OEM rails 40, 42 have a C-shaped cross section, such as shown in the drawings, an open side of the OEM rails 40, 42 may face each other (i.e., will face inboard of the vehicle 10). An overall length of the OEM rails 40, 42 (i.e., a horizontal extent of the OEM rails 40, 42) can vary depending on the type and size of the vehicle 10. A height of the OEM rails 40, 42 (i.e., a vertical extent of the OEM rails 40, 42) may be between 6 and 10 inches, or typically about 8 inches. A thickness of the material comprising the OEM rails 40, 42 may be between about three-sixteenths to five-sixteenths inches or about one-quarter inch. Because of the strength requirements of the vehicle chassis, the OEM rails 40, 42 may typically be made from a high-strength material, such as ASTM A36 steel.

With reference to FIG. 1, it should be understood that a passenger cab (not shown) can be added as a component of the vehicle by positioning such a passenger cab over the central and rear sections 22, 24 of the OEM frame 18. However, when the vehicle 10 is received from the original equipment manufacturer, it is configured in a high-profile configuration, with the OEM frame 18 (including the OEM rails 40, 42) extending a significant distance from the ground surface. As such, when a passenger cab is added to the vehicle 10, the passenger cab is similarly situated in a significant distance from the ground surface, which creates difficulty for passengers to ingress and egress from the vehicle 10.

To modify the OEM vehicle 10, described above, from its original high-profile configuration to a low-profile configuration, embodiments of the present invention include a modification system configured to facilitate such a modification. The modification system of the present invention provides for the vehicle 10 OEM frame 18 to be modified to such a low-profile configuration, wherein at least a portion of modified frame will extend above the ground at a reduced distance than that of the OEM frame 18. As such, when a passenger cab is added to the vehicle 10, the passenger cab will be situated a correspondingly-reduced distance from the ground surface, so as to accommodate ingress and egress of passengers from the vehicle 10.

Figure 3:
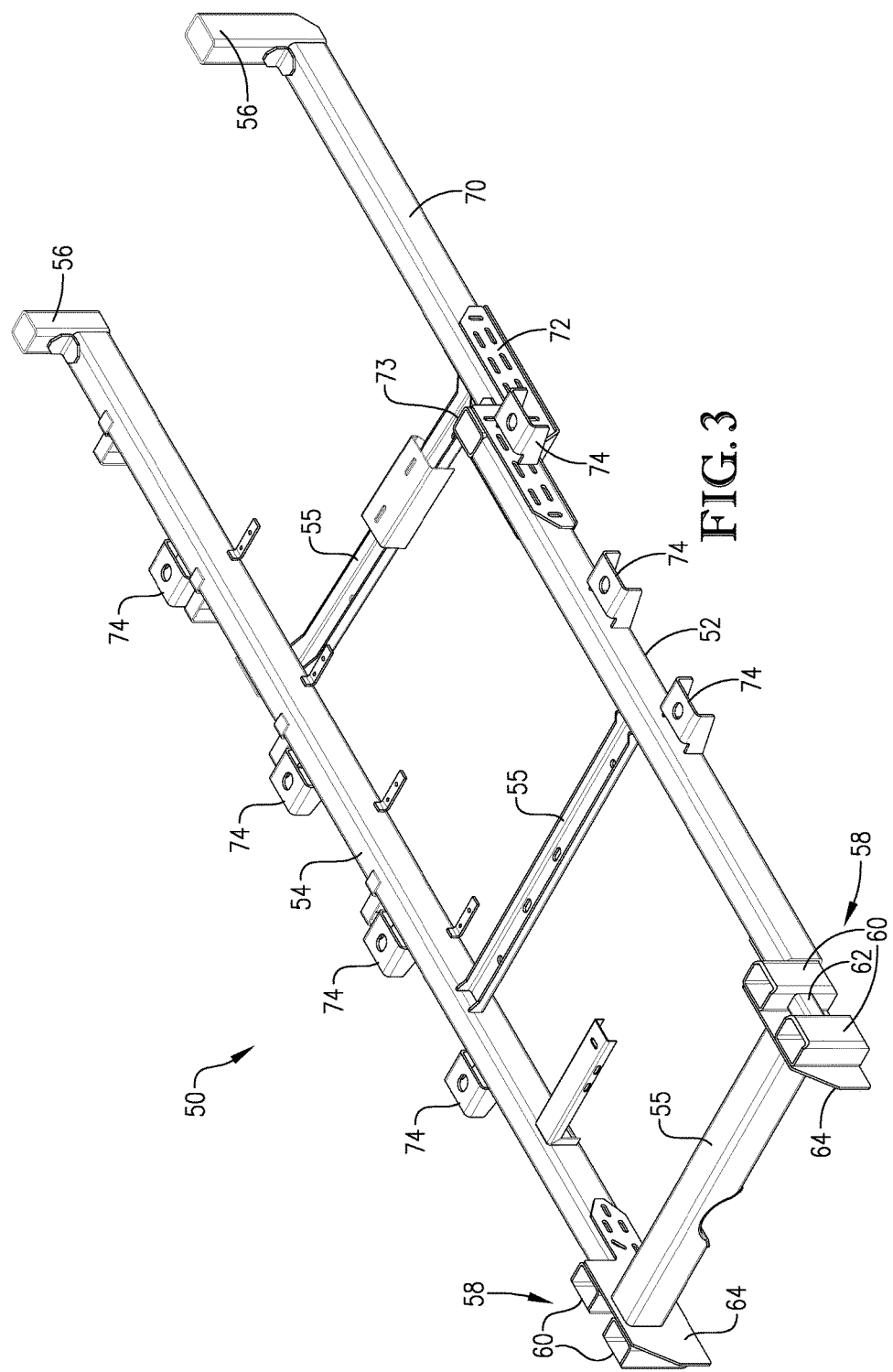
FIG. 3 is right side rear perspective view of a drop frame insert according to embodiments of the present invention.
Figure 4:
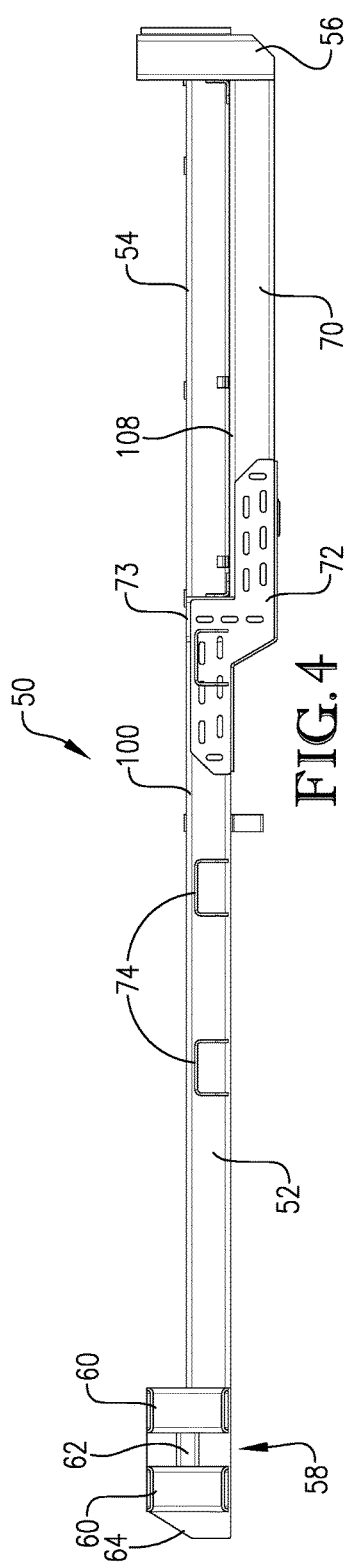
FIG. 4 is a right side elevation view of the drop frame insert from FIG. 3.

Broadly, the modification system of embodiments of the present invention comprises a drop frame insert 50, as illustrated in FIGS. 3 and 4, which may comprise a right longitudinal drop rail 52 and a left longitudinal drop rail 54. The drop rails 52, 54 may be generally positioned in parallel relationship with each other and may be connected by one or more lateral cross-members 55. As such, the drop rails may be separated by a distance of between 25 and 50 inches, between 30 and 40 inches, or about 36 inches. The drop rails 52, 54 may be formed from tubes of high-strength material, such as ASTM A36 Steel. The drop rails 52, 54 may have a height (shown as a vertical distance in FIG. 4) that is between 3 and 5 inches or about 4 inches. A width of the drop rails 52, 54 may be between 2 and 4 inches or about 3 inches. A thickness of the material comprising the drop rails 52, 54 may be between about three-sixteenths to five-sixteenths inches or about one-quarter inch. In some specific embodiments, the drop rails 52, 54 will be formed from tube steel having dimensions of 4 inches by 3 inches by ¼ inch. In some embodiments, the drop rails 52, 54 may have a length of between 75 and 135 inches, between 85 and 115 inches, or between 95 and 105 inches. In some specific embodiments, the drop rails 52, 54 can have a length of about 99 inches, 105 inches, or 118 inches.

At front ends of the drop rails 52, 54, the drop frame insert 50 may include vertically-extending front connection components 56. The front connection components 56 may be formed from tubes of high-strength material, such as ASTM A36 steel, with dimension similar to those of the drop rails 52, 54. For example, in some specific embodiments, the front connection components 56 will be formed from tube steel having dimensions of 4 inches by 3 inches by ¼ inch. The front connection components 56 may have a height (shown as a vertical distance in FIG. 4) of between 7 and 9 inches or about 8 inches. In some embodiments, the height of the front connection component 56 may generally match the height of the OEM rails 40, 42. The front connection components may be rigidly secured to the drop rails 52, 54 via various methods of attachment, such as by weld (e.g., stitch weld). It is noted that the phrase "rigidly secured," as used herein, means that objects are united, directly or indirectly, in a manner that mitigates relative motion between the objects. Accordingly, objects can be rigidly engaged via welds, bolted joints, gusset plates, and the like or combinations thereof.

At rear ends of each of the drop rails 52, 54, the drop frame insert 50 may include H-shaped reinforcement assemblies 58. Each of the reinforcement assemblies 58 may comprise a pair of vertically-extending tube sections 60 connected by a horizontally-extending tube section 62, so as to form an H-shape. The sections of the H-shaped reinforcement assembly may be formed from tubes of high-strength material, such as ASTM A36 steel. The vertically-extending sections 60 may be formed from tube steel having dimension similar to those of the drop rails 52, 54. For example, in some specific embodiments, the vertically-extending sections 60 will be formed from tube steel having dimensions of 4 inches by 3 inches by ¼ inch. The vertically-extending sections 60 may have height (shown as a vertical distance in FIG. 4) of between 7 and 9 inches or about 8 inches. In some embodiments, the height of the vertically-extending sections 60 will generally match, or will be at least nominally smaller than, the height of the OEM rails 40, 42. For instance, in some embodiments, the vertically-extending sections 60 may have height of about 7.5 inches. The horizontally-extending sections 62 may, in some specific embodiments, be formed from tube steel having dimensions of 2 inches by 2 inches by ¼ inch. The horizontally-extending sections 62 may have a length (shown as a horizontal distance in FIG. 4), of between 2 and 4 inches or about 3 inches. In some embodiments, the sections of the reinforcement assembly 58 may be rigidly secured together by weld, such as by stitch welding the horizontally-extending section 62 to each of the vertically-extending sections 60. Similarly, the reinforcement assemblies 58 may be rigidly secured to the rear ends of the drop rails 52, 54 by weld. In some additional embodiments, the connection between the reinforcement assemblies 58 and the right and left drop rails 52, 54 may be enhanced via gusset plates 64 positioned on the inboard sides of the reinforcement assemblies 58 and the drop rails 52, 54. The gusset plates 64 may themselves be rigidly secured to the reinforcement assemblies 58 and/or the right and left drop rails 52, 54 via weld (e.g., stitch and/or plug weld). As shown in FIG. 3, a rear-most cross-member 55 may extend between the reinforcement members 58 and/or the gusset plates 64 to provide additional support to the drop frame insert 50.

In some embodiments, as shown in FIGS. 3 and 4, the drop frame insert 50 may include an extended drop section 70 that is positioned in place of a portion of one of the right or left drop rails 52, 54. For example, as shown in the drawings, the extended drop section 70 may replace a portion of the right drop rail 52 immediately rearward of the front connection component 56. The extended drop section 70 may be formed from tubes of high-strength material, such as ASTM A36 steel, with dimension similar to those of the drop rails 52, 54. For example, in some specific embodiments, the extended drop section will be formed from tube steel having dimensions of 4 inches by 3 inches by ¼ inch. The extended drop section 70 may have a length of between about 40 and 50 inches or about 46 inches. As such, the extended drop section 70 will be rigidly secured to (e.g., via stich weld) and extend from the front connection component 56 to the forward-most portion of the right drop rail 52, where it can be rigidly engaged to the right drop rail 52 by weld and/or by gusset plates 72 positioned on inboard and outboard sides of the right drop rail 52 and the extended drop section 70. In some embodiments, a vertically-extending drop section 73 connection component may facilitate the junction between the extended drop section 70 and the right drop rail 52.

As perhaps best shown by FIG. 4, the extended drop section 70 may be positioned lower than the right drop rail 52. In some embodiments, the extent to which the extended drop section 70 is lower than the right drop rail 52 will correspond with the height of the drop rails 52, 54 (e.g., 4 inches). Such correspondence is generally due to certain embodiments in which a top surface of the extended drop rail 70 is generally coplanar with a bottom surface of the drop rails 52, 54. As such, if the drop rails have a height of 4 inches, then the top surface of the extended drop rail 70 may be approximately 4 inches lower than the top surface of the drop rails 52, 54. As will be described in more detail below, because the extended drop section 70 extends lower than the right drop rail 52, the extended drop section 70 provides an enhanced lowering of a portion of the vehicle frame, so as to facilitate the use of a lowered platform step insert, which can be used to accommodate ingress and egress from the passenger cab of the vehicle 10.

An overall length of the drop frame insert 50 may vary depending on a required overall length of the vehicle 10 after modification from the high-profile configuration to the low-profile configuration. In some embodiments, the drop frame insert 50 can have a length of between 90 and 150 inches, between 100 and 130 inches, or between 110 and 120 inches. In some specific embodiments, the drop frame insert 50 can have a length of about 113 inches, 119 inches, or 132 inches. In addition, as shown in FIG. 3, the drop frame insert 50 may include a plurality of puck mounts 74. The puck mounts 74 may be rigidly secured to the drop rails 52, 54 via weld and may formed as planar brackets with apertures for holding resilient pucks elements (not shown). The puck elements may be formed from various resilient materials, such as plastics, rubbers, or the like. As will be described in more detail below, the puck mounts 74 and the puck elements are configured to support a subfloor assembly that will be used as a base for the passenger cab that can be added to the vehicle 10.

Figure 6:
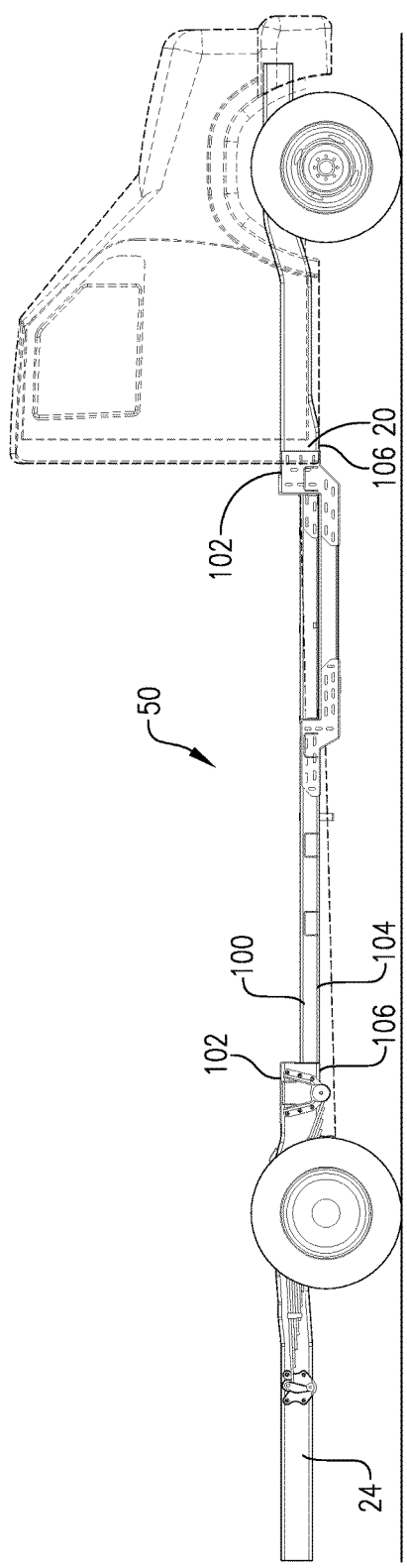
FIG. 6 is a right side elevation view of the vehicle and drop frame insert from FIG. 5.
Figure 5:
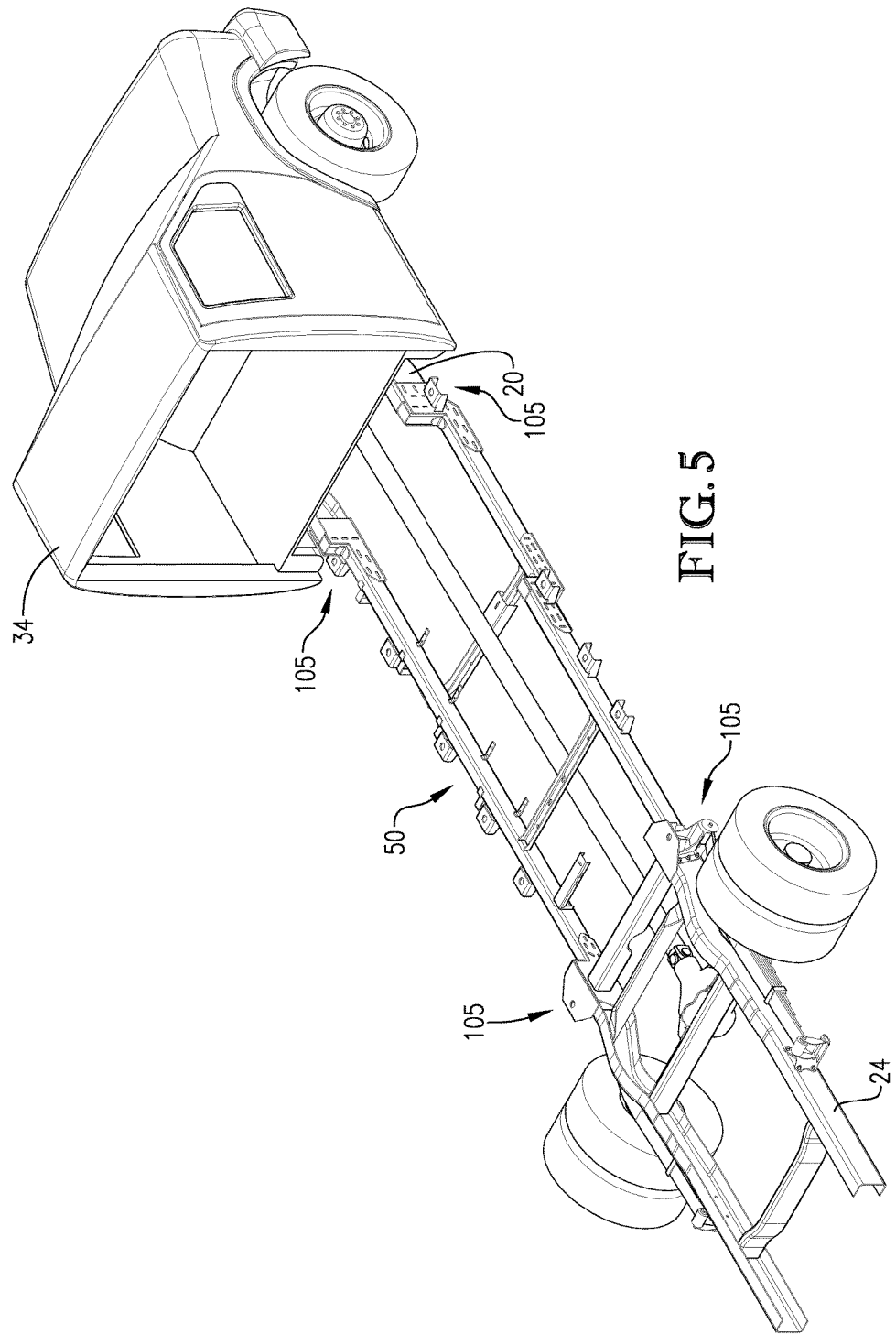
FIG. 5 is a right side rear perspective view of the vehicle from FIGS. 1 and 2, with the central section of the frame removed and the drop frame insert from FIGS. 3 and 4 inserted in place of the central section.

The drop frame insert 50 is configured to be positioned between the front and rear sections 20, 24 of the OEM frame 18. Specifically, as shown in FIGS. 5 and 6, the drop frame insert 50 can be integrated with the vehicle 10, such that it replaces the central section 22 of the OEM frame 18. Because a height of the drop rails 52, 54 may be less than the height of the OEM rails (i.e., 4 inches vs. 8 inches), the drop frame insert 50 provides for the vehicle 10 to be converted from a high-profile configuration to a low-profile configuration. As such, a passenger cab (not shown) that is positioned rearward of the driver cab 34, i.e., over the drop frame insert 50 and rear section 24 of the frame 18, will have a floor level over the drop frame insert 50 that is at a relatively lower level (i.e., closer to the ground level) for easier passenger access. Contrastingly, the floor level of such a passenger cab that is positioned over the rear section 24 of the OEM frame 18 may be at a relatively higher level (i.e., further from the ground level), which corresponds with the relatively higher level of the OEM frame 18.

Figure 7:
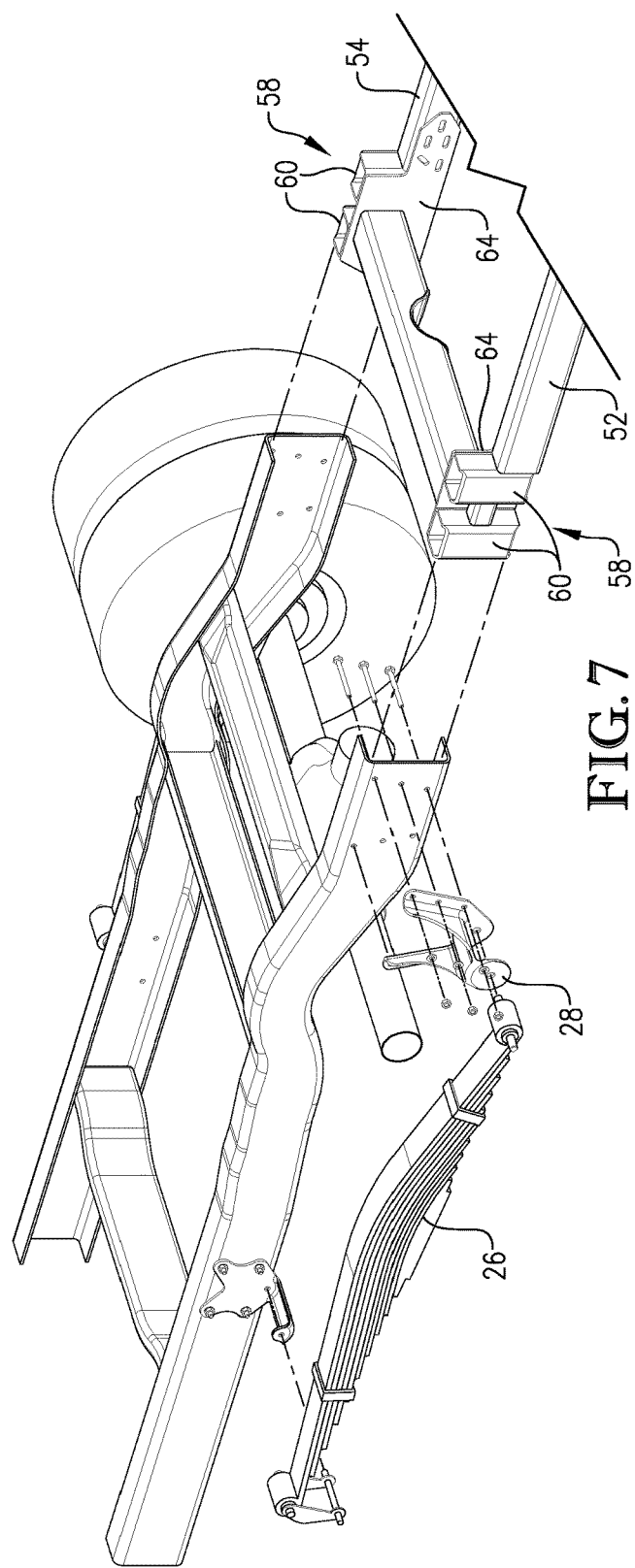
FIG. 7 is a perspective view of a rear section of the vehicle chassis and from FIGS. 1 and 2, particularly illustrating a rear end of the drop frame insert from FIGS. 3 and 4 in a process of being engaged with the rear section of the vehicle chassis.

To modify the vehicle 10 with the drop frame insert 50 so as to convert the vehicle 10 from the high-profile configuration to the low-profile configuration, the central section 22 of the vehicle's OEM frame 18 may first need to be removed. To accomplish such removal, suspension elements associated with the rear axle 16 and rear wheels 38 may need to be removed. For instance, as illustrated in FIG. 7, when leaf springs 26 are used, the leaf springs 26 and associated spring hangers 28 may each need to be removed from each of the right and left rails 40, 42 of the OEM frame 18. In some embodiments, such removal will simply require the extraction of nut and bolt combinations that are used to hold the spring hangers 28 in place. Furthermore, in some embodiments, only a forward spring hanger 28 of each of the leaf springs 26 may require removal.

Next, as perhaps best shown in FIG. 2, generally vertical cuts 80 may be made across the right and left OEM rails 40, 42 rearward of the front section 20 of the OEM frame 18 (i.e., immediately rearward of the driver cab 34 of the vehicle 10). Similarly, generally vertical cuts 80 may be made across the right and left OEM rails 40, 42 forward of the rear section 24 of the OEM frame 18 (e.g., forward of the rear axle 16 of the vehicle 10). Upon making the vertical cuts 80, the right and left OEM rail 40, 42 portions that make up the central section 22 may be removed. In some embodiments, the length of such removed right and left OEM rail 40, 42 portions will be between 20 and 60 inches, between 30 and 50 inches, or about 40 inches. Once the OEM rail 40, 42 portions have been removed, the drop frame insert 50 can be inserted in their place, as is shown in FIGS. 5 and 6. In some embodiments, because the drop frame insert 50 may have a length that is greater than the removed OEM rail portions 40, 42, the modification of the vehicle 10 described herein will act as an extension, so to extend the wheelbase of the vehicle 10. As such, in some embodiments, the vehicle's 10 driveshaft 30, exhaust (not shown), and other operating components that extend along the vehicle's 10 chassis 12 may need to also be cut away and at least temporarily removed to allow for the insertion of the drop frame insert 50. In such embodiments, the operating components of the vehicle 10 may need to be individually modified so as to be configured for use with the final modified vehicle 10. For example, if the drop frame insert 50 operates to extend the wheelbase of the vehicle 10, then the driveshaft 30 and exhaust may be need to be modified (e.g., extended) for use with the modified vehicle 10.

Figure 8:
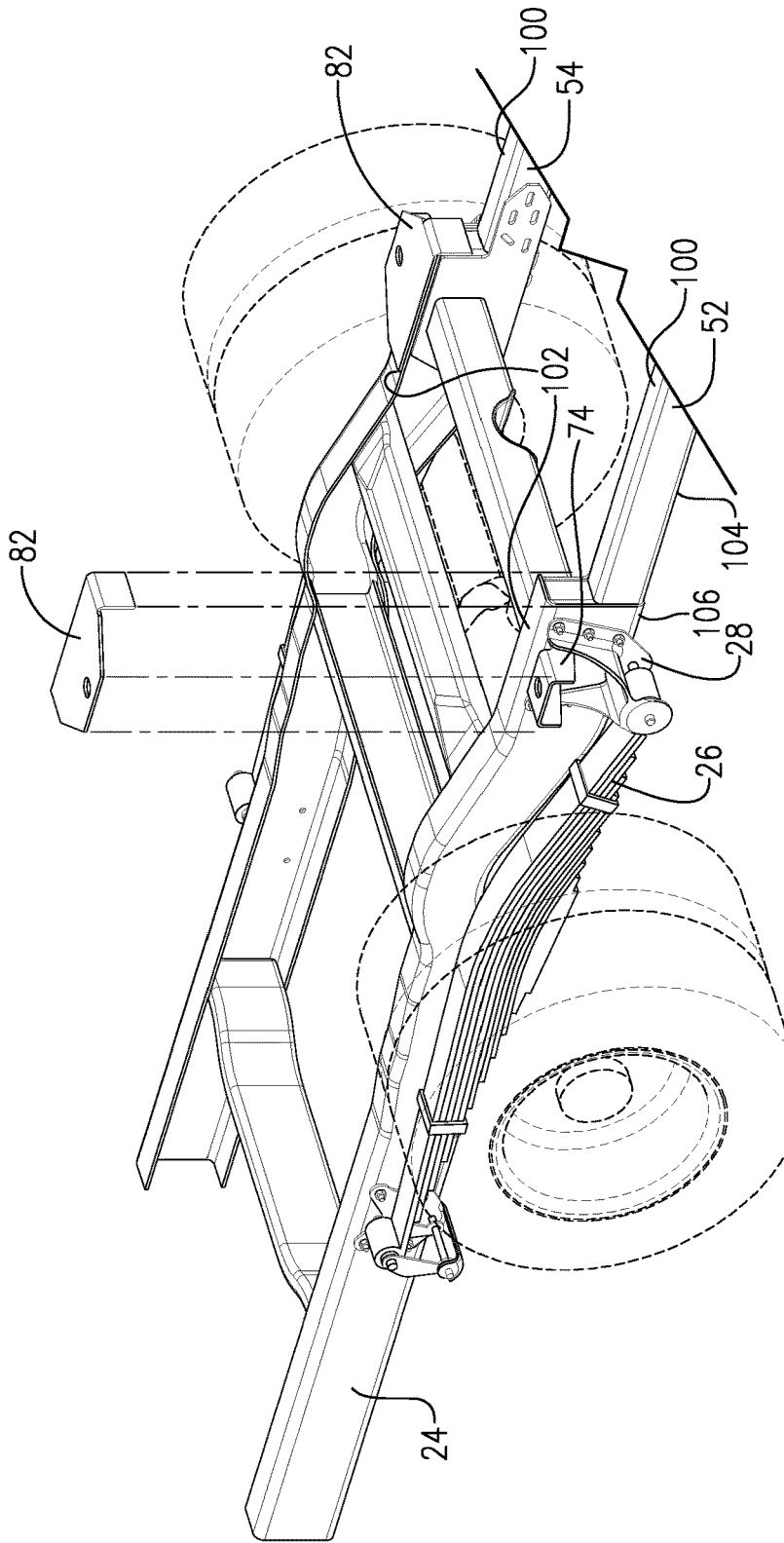
FIG. 8 is a perspective view of the drop frame insert and the rear section of the vehicle chassis from FIG. 7 rigidly secured together.

With the OEM rails 40, 42 portions that make up the central section 22 removed, the drop frame insert 50 may be integrated with the remaining portions of the OEM frame 18. To accomplish such integration, as illustrated in FIGS. 7 and 8, the rear end of the drop frame insert 50 may be rigidly secured with the rear section 24 of the OEM frame 18, adjacent to where the vertical cuts 80 were made. In instances in which the OEM frame 18 is comprised of rails 40, 42 with a C-shaped cross-section (i.e., C-channel), at least a portion of the rear end of the drop frame insert 50 may be inserted within the cavity presented by the C-channels. In some embodiments, such portion of the rear end of the drop frame insert 50 includes the reinforcement assemblies 58. In certain embodiments, the entire reinforcement assemblies 58 associated with each of the drop rails 52, 54 may be inserted within the cavity presented by the C-channels. Once the reinforcement assemblies 58 are inserted within the rear section 24 of the OEM frame 18, holes can be drilled through the vertically-extending sections 60 of the reinforcement assemblies 58 and through the associated gusset plates 64, with such holes being aligned with the holes in the OEM frame 18 that received the bolts that securing the forward spring hangers 28 in place.

To rigidly secure the rear end of the drop frame insert 50 in place, the rear portion of the drop frame insert 50 may be welded to the rear section 24 of the OEM frame 18. In addition, the spring hangers 28 and the leaf springs 26 can be reattached to the OEM frame 18, via nut and bolt combinations. However, because the reinforcement assemblies 58 of the drop frame insert 50 are inserted within the C-channel of the OEM rails 18, the nut and bolt combinations of the spring hangers 28 (specifically the forward spring hangers) will also extend through the reinforcement assemblies 58 and through the associated gusset plates 64 so as to further secure the drop frame insert 50 in place with respect to the rear section 24 of the OEM frame 18. Furthermore, as particularly shown in FIG. 8, a cap section 82 may be secured over each of the connection locations of the rear end of the drop frame insert 50 and the rear section 24 of the OEM frame. The cap sections 82 may be held in place by weld or other methods of attachment. In some embodiments, a portion of the cap sections 82 may extend over a puck mount 74. In such embodiments, each cap section 82 may have an aperture formed therethrough, with such aperture aligning with the aperture on the puck mount 74 for receiving the puck element.

Figure 9:
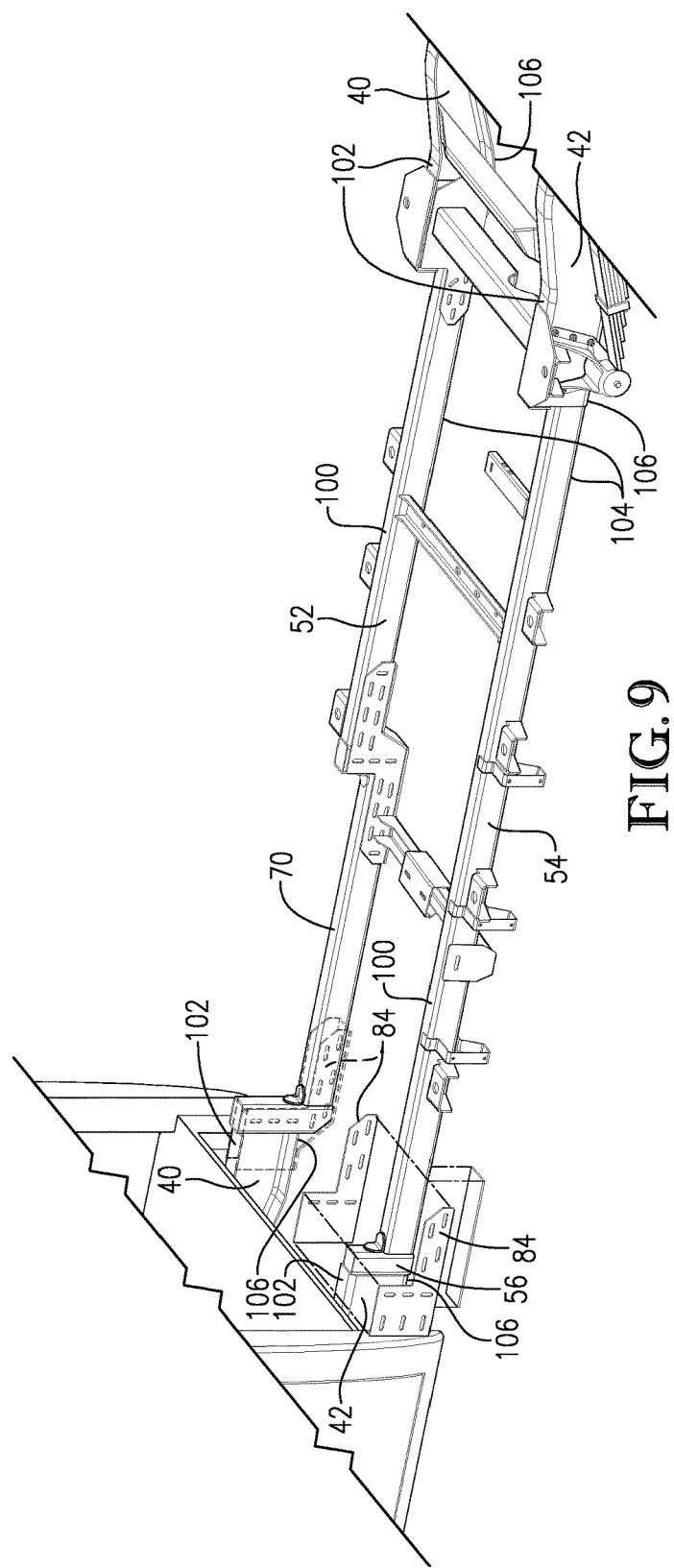
FIG. 9 is a left side partial perspective view of the vehicle chassis from FIGS. 1 and 2, particularly illustrating the drop frame insert from FIGS. 3 and 4 being engaged with the vehicle chassis at both a front end and a rear end of the drop frame insert.

Turning to a front end of the drop frame insert 50, as shown in FIG. 9, the vertically-extending connection components 56 on the right and left drop rails 52, 54 can each be aligned with the right and left OEM rails 40, 42 on the front section 20 of the OEM frame 18. In such an orientation, the connection components 56 can be welded (e.g., stich welded) to the front section 20 of the OEM frame 18 to rigidly secure the drop frame insert 50 to the OEM frame 18. The connection components 56 can be further secured to the OEM frame 18 through use of gusset plates 84 welded (e.g., plug welded) to each of the inboard and outboard sides of the adjacent drop rails 52, 54 (or extended drop section 70) and OEM rails 40, 42.

Figure 10:
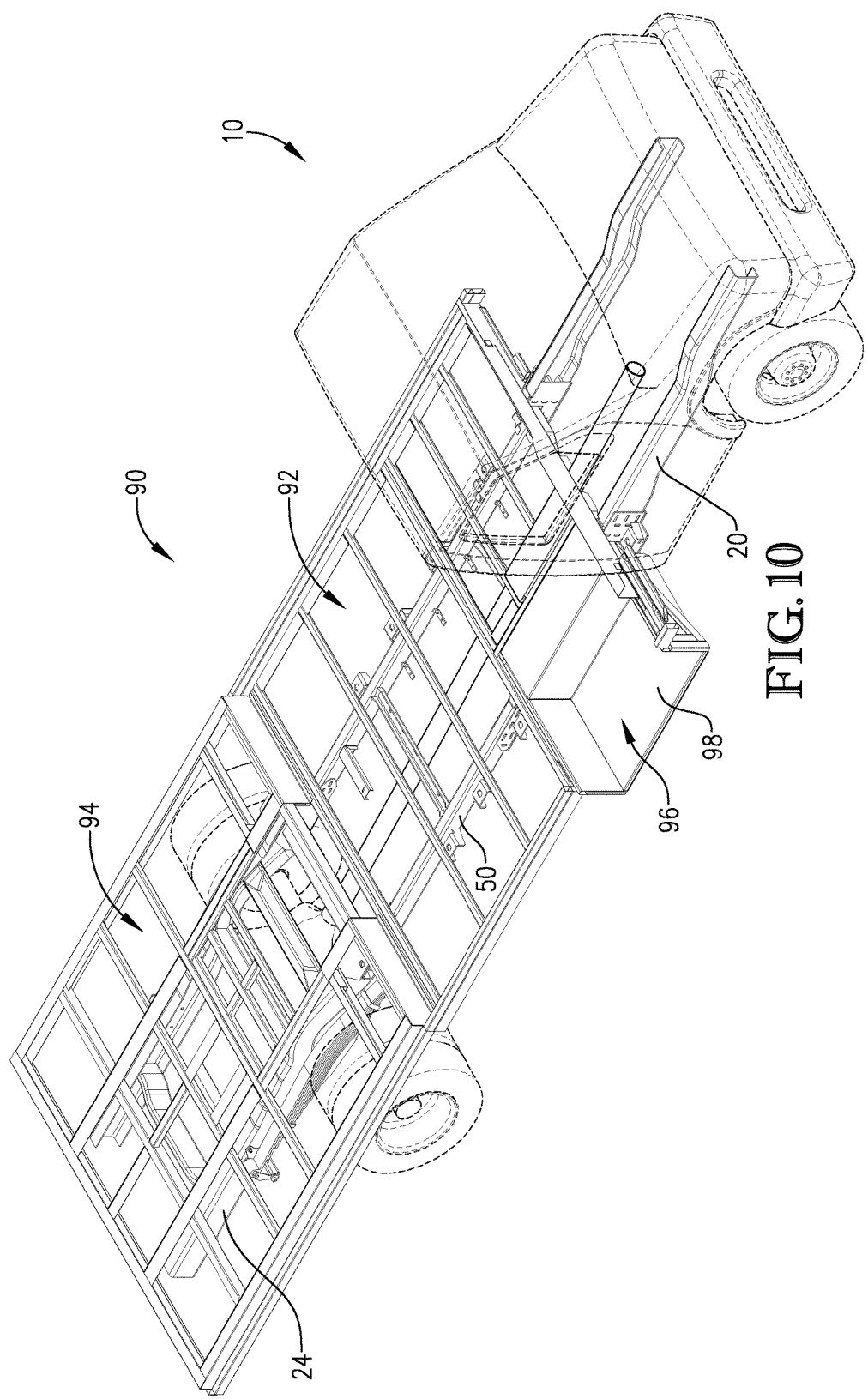
FIG. 10 is right side front perspective view of the vehicle and drop frame insert from FIG. 5, and further including a subfloor assembly positioned over the drop frame insert and a rear section of the vehicle chassis.
Figure 12:
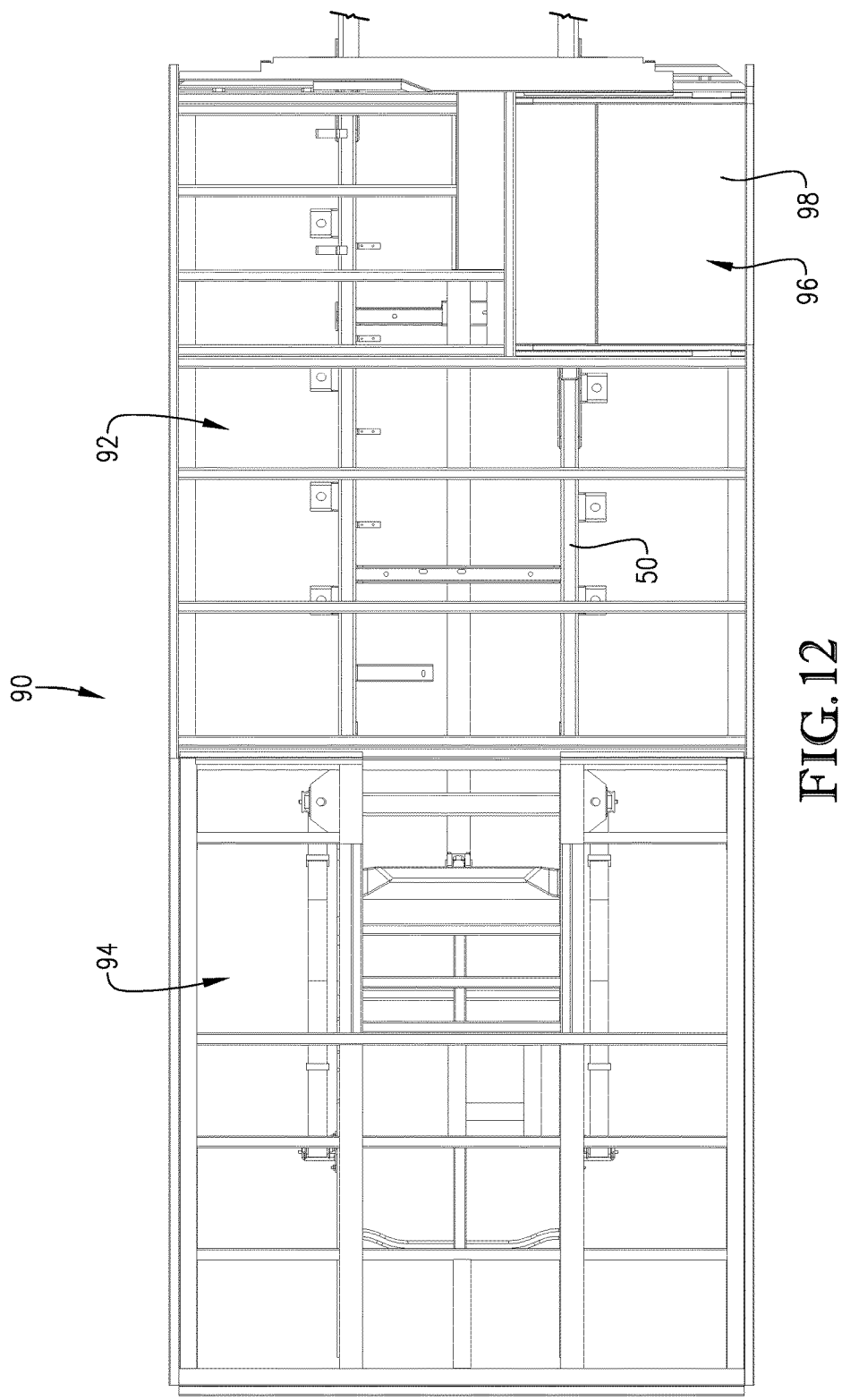
FIG. 12 is a partial plan view of the vehicle, the drop frame insert, and the subfloor assembly from FIGS. 10 and 11.

With the drop frame insert 50 rigidly secured to the OEM frame 18 of the vehicle 10, as described above and as shown in FIGS. 5 and 6, a subfloor assembly 90, as shown in FIGS. 10-12, can be mounted to the resulting vehicle 10 chassis 12. Specifically, the subfloor assembly 90 can be mounted to the vehicle 10 chassis 12 via the puck mounts 74 that extend from the drop frame insert 50 and/or OEM frame 18 of the vehicle 10. The subfloor assembly 90 is configured to provides support for the passenger cab (not shown), which can be mounted above of the subfloor assembly 90. As should be understood, the passenger cab can be configured to enclose a space in which passengers can stand or be seated in seats, such that the vehicle 10 can operated as a bus or a shuttle in which its occupants are transported as passengers. As shown in the FIGS. 10-12, the subfloor assembly 90 can be bounded by an outer frame and a plurality of lateral and longitudinal support cross-beams extending between the outer frame. As such, the subfloor assembly 90 can define a plurality of sections including a landing section 92 with a substantially level surface for providing seating for passengers and for securing passengers seated within wheel chairs. The subfloor assembly 90 can also include an elevated passenger section 94 for providing additional seating for passengers. The landing section 92 may include an access platform section 96, which is configured to removably receive various types of platform inserts 98 (See FIG. 13) for providing ingress and egress from the vehicle.

As illustrated in FIGS. 10 and 11, the landing section 92 of the subfloor assembly 90 may be generally positioned over the drop frame insert 50. Contrastingly, the passenger section 94 of the subfloor assembly 90 may be generally positioned over the rear section 24 of the OEM frame 18. Because the drop frame insert 50 is generally situated at a lower level than the OEM frame 18 (i.e., closer to a ground surface), the landing section 92 can be similarly situated at a correspondingly-lower level (i.e., closer to a ground surface) than the passenger section 94. With the landing section 92 situated at a low position, i.e., closer to the ground surface, efficient passenger ingress and egress from the vehicle 10 is provided.

In more detail, as shown in FIGS. 6 and 8-9, a top surface 100 of the rails 52, 54 of the drop frame insert 50 is positioned at a lower level than a top surface 102 of the OEM frame 18 (i.e., the top surface 102 of the rails 40, 42 of the front and rear sections 20, 24 of the OEM frame 18). In certain embodiments, the top surface 100 of the rails 52,52 may be lower than the portion of the OEM frame's 18 top surface 102 that is located adjacent to connection locations 105 (See FIG. 5) between the drop frame insert 50 and OEM frame 18. For example, the top surface 100 of the rails 52,52 may be lower than the portion of the OEM frame's 18 top surface 102 that is adjacent to the vertical cuts 80 (See FIG. 2). In some specific embodiments, the top surface 100 of the rails 52, 54 of the drop frame insert 50 may be approximately 4 inches lower than the top surface 102 of the OEM frame. Such a lowered position is made possible by the drop rails 52, 54 of the drop frame insert 50 being formed as tubes, with an overall height that is less than that of the height of the OEM rails 40, 42. Specifically, as was previously described, the height of the drop rails' 52, 54 tube steel may be about 4 inches, while the height of the OEM rails 40, 42 may be about 8 inches. Beneficially, the tube steel of the drop rails 52, 54 allows the drop frame insert 50 to maintain sufficient strength necessary to properly integrate with the vehicle 10 chassis 12. Furthermore, the lowered position of the drop frame insert 50 is made possible without requiring a lowermost portion of the drop rails 52, 54 to extend lower than the OEM rails 40, 42 (with the exception of the extended drop section 70). Specifically, as shown in FIGS. 6 and 8-9, a bottom surface 104 of the drop rails 52, 54 of the drop frame insert 50 may be generally coplanar, level with, and/or does not extend below a bottom surface 106 of the OEM frame 18 (including each of the front section 20 and the rear section 24 of the OEM frame 18). In certain embodiments, the bottom surface 104 of the rails 52,52 may be generally level with the portion of the OEM frame's 18 bottom surface 106 that is located adjacent to the connection locations 105 (See FIG. 5) between the drop frame insert 50 and OEM frame 18. For example, the bottom surface 104 of the rails 52,52 may be generally level with the portion of the OEM frame's 18 bottom surface 106 that is adjacent to the vertical cuts 80 (See FIG. 2). As such, the drop frame insert 50 of embodiments of the present invention can be used on various styles of vehicles 10 each having various wheel base sizes. For longer wheel bases, a drop frame insert 50 with longer drop rails 52, 54 can be used, while for shorter wheel bases, a drop frame inert 50 with shorter drop rails 52, 54 can be used.

Given the drop frame insert 50 described above, the landing section 92 of the subfloor assembly 90 can be positioned lowered than the passenger section 94 so as to facilitate ingress and egress, particular by passengers with disabilities, such as those in wheel chairs. To further facilitate ingress and egress, the subfloor may include a platform insert 98 (as shown in FIGS. 10-13) received with the access platform section 96, with such platform insert extending even lower than the landing section 92. Such a lower extension can be facilitated, in part, by the platform insert 98 being positioned over the extended drop section 70 of the drop frame insert 50. As described above, and as perhaps best illustrated by FIG. 4, a top surface 108 of the extended drop section 70 of the drop frame insert 50 may be positioned about 4 inches lower than the top surface 100 of the drop rails 52, 54 of the drop frame insert 50. Correspondingly, the top surface 108 of the extended drop section 70 of the drop frame insert 50 may be positioned generally coplanar or level with the bottom surface 104 of the drop rails 52, 54 of the drop frame insert 50. As such, the platform insert 98 is capable of being positioned quite low and close to the ground surface, so as to allow for passengers to efficiently ingress and egress from the vehicle.

Such ingress and egress is further facilitated by the subfloor assembly 90 incorporating the use of platform inserts 98 that can be removably installed with the access platform section 96 of the subfloor platform 90. For example, as shown in FIG. 13, the platform insert 98 may comprise a platform step, which provides an entrance step from which passengers can ingress and egress from the vehicle 10. Other types of platform inserts 98 may include a fixed ramp (not shown) or actuating extension ramp (not shown), which may be used to provide access to the vehicle 10 for passengers with disabilities, such as those passengers confined to wheel chairs. With respect to the platform step-type of platform insert 98, as shown in FIG. 13, the platform insert 98 may comprise a base entrance platform 110 and a raised step 112. A top of the raised step 112 may generally be positioned at level that corresponds with the landing section 92 of the subfloor assembly 90 when the platform insert 98 is installed with the subfloor assembly 90. The entrance platform 110 may be positioned between 10 to 14 inches, between 11 and 13 inches, or about 12 inches below the top of the raised step 112. The ability of the entrance platform 110 to extend such a distance below the top portion of the raised step 112 is due, at least in part, to the extent that the extended drop section 70 extends down from the drop rails 52, 54 of the drop frame insert 50. The platform insert 98 may include structural components that are rigidly engaged or integral with one another to form a structure suitable for handling the loads generated during ingress or egress of passengers. For instance, the platform insert 98 may be formed from metals such as, for example, steel or aluminum.

In contrast to the platform step, the fixed ramp or actuating extension ramp versions of the platform insert 98 will, in general, provide for an entrance ramp to the vehicle 10. For instance, such an entrance ramp may have a lowered end that is located near an outer boundary of the subfloor assembly 90 and a raised end that is higher in elevation than the lowered end. As such, the fixed ramp or actuating extension ramp presents an inclined surface that has a gradually increasing slope from the lowered end to the raised end. Such ramps can have a substantially smooth surface that gradually inclines such that passengers with limited mobility and dexterity can traverse the ramp to the landing section 92. Furthermore, the actuating extension ramp may have associated therewith, actuating mechanisms that allow the ramp to extend, slide, rotate, or otherwise actuate so that the lowered end of the ramp may be positioned adjacent to the ground to facilitate ingress and egress of the vehicle 10, particularly for handicap passengers.

Beneficially, as noted above, embodiments of the present invention provide for the various different platform inserts 98 to be interchangeably integrated with the subfloor assembly. As such, for instance, if the vehicle 10 normally incorporates the platform step-type of platform insert 98 (i.e., as shown in FIG. 13) during operation, but has a need for a fixed ramp or actuating extension ramp, such as for transporting individuals with disabilities (e.g., passengers confined to wheelchairs), embodiments of the present invention provide for the platform step to be removed and the fixed ramp or actuating extension ramp to be installed in its place. To facilitate such interchangeability, as shown in FIG. 13, the platform inserts 98 may each include a pair of spaced apart triangular shaped base sections 120 (only a single base section 120 is shown in FIG. 13, with the other base section 120 being blocked from view but mirrored on the opposite side of the platform insert 98). Each of the base sections 120 may comprise a vertical support member 122, a horizontal support member 124, and a diagonal support strut 124. As shown in FIG. 13, the components of the base sections 120 can be rigidly secured together to form a triangular shape, though such a specific shape is not required. The horizontal support members 124 may include a plurality of through-holes, through which bolts or other fasteners may be inserted. The outer frame and/or lateral support struts of the access platform section 96 of the subfloor assembly 90 may include corresponding through-holes, such that the platform insert 98 can be removably secured to the subfloor assembly 90 (within the access platform section 96) via nut and bolt combinations. Specifically, a particular platform insert 98 (e.g., the platform step-type) may be inserted and secured within the subfloor assembly 90 via the nut and bolt combinations. If a need arises to replace the platform step-type platform insert 98 with a ramp-type platform insert 98, the platform step-type platform insert 98 can be removed from the subfloor assembly by unfastening the nut and bolt combination and removing the platform step-type platform insert 98 from the subfloor assembly 90. Thereafter, a ramp-style platform insert 98 can be inserted within the access platform section 96 of the subfloor assembly 90 and rigidly secured in place with the nut and bolt combination.

Given the description provided above, it should be understood that the embodiments described herein can provide a method and system that facilitate the modification of a vehicle 10 from an original high-profile configuration to a low-profile configuration by modifying the vehicle's 10 chassis 12 to include the drop frame insert 50 described herein. Beneficially, the drop frame insert 50 provides for the vehicle 10 to have a low-profile configuration, while maintaining the structural integrity of the vehicle 10 chassis 12. Specifically, the ability of the reinforcement assembly 58 of the drop frame insert 50 to be inserted within, and rigidly secured to, the C-channel of the OEM rails 40, 42 allows the drop frame insert 50 to be connected to the OEM frame 18 at high level of structural strength. In addition, the drop rails 52, 54 being formed from tubes allows for the drop frame insert 50 to be positioned at a lower level than the OEM rails 40, 42, while remaining substantially horizontal (i.e., flat and level). The ability to remain substantially flat and level facilitates the ability of the landing section 92 of the subfloor assembly 90 to be orientated substantially horizontal (i.e., flat and level), which facilitates ingress and egress and which further provides a level platform on which passengers can reside during transport in the vehicle 10. Finally, the configuration of the subfloor assembly 10 and the platform inserts 98 provide for interchangeability of platform inserts 98 in an efficient manner, such that various different platform inserts 98 may be interchanged as needed by the operator of the vehicle 10.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle for transporting passengers comprising:
a chassis that includes a front axle, a rear axle, and a frame comprising a front section that supports said front axle and a rear section that supports said rear axle; and
a drop frame insert located between said front section of said frame and said rear section of said frame,
wherein said drop frame insert comprises a longitudinally-extending left rail and a longitudinally-extending right rail, wherein said left rail and said right rail are spaced apart and extend in generally parallel relationship,
wherein a top surface of each of said left rail and said right rail of said drop frame insert is positioned lower than a top surface of said frame, and wherein at least a portion of a bottom surface said drop frame insert is generally coplanar with a bottom surface of said frame,
wherein said drop frame insert includes a reinforcement assembly positioned at a rear end of each of said left rail and said right rail, wherein said reinforcement assemblies are configured to be engaged with said rear section of said chassis frame.

2. The vehicle of claim 1, wherein said drop frame insert is orientated generally horizontally.

3. The vehicle of claim 1, wherein said right rail and said left rail comprise tubes.

4. The vehicle of claim 1, wherein said reinforcement assemblies each comprises a pair of vertically-extending tubes connected by a horizontally-extending tube, such that each of said reinforcement assemblies is configured in an H shape.

5. The vehicle of claim 1, wherein said chassis frame of said vehicle is formed from C-channels, and wherein said reinforcement assemblies are at least partially received in the C-channels of said rear section of said chassis frame.

6. The vehicle of claim 5, wherein said reinforcement assemblies are secured in place within said C-channels via weld and/or one or more nuts and bolts.

7. The vehicle of claim 6, wherein said one or more nuts and bolts are used to secure said reinforcement assemblies in place and are also used to secure a spring hanger and vehicle spring in place.

8. The vehicle of claim 1, wherein said drop frame insert includes a vertically-extending connection component positioned at a front end of each of said left rail and said right rail, wherein said connection components are configured to be engaged with said front section of said chassis frame.

9. The vehicle of claim 8, wherein said connection components are secured in place with respect to said front section of said chassis frame via weld and/or one or more gusset plates.

10. A vehicle for transporting passengers comprising:
a chassis that includes a front axle, a rear axle, and a frame comprising a front section that supports said front axle and a rear section that supports said rear axle; and
a drop frame insert located between said front section of said frame and said rear section of said frame,
wherein at least a portion of a top surface of said drop frame insert is positioned lower than a top surface of said frame, and wherein at least a portion of a bottom surface of said drop frame insert is generally coplanar with a bottom surface of said frame,
wherein said vehicle further includes a subfloor positioned on top of said chassis frame and on top of said drop frame insert, wherein said subfloor comprises a generally level landing section positioned over said drop frame insert and an elevated passenger section positioned over said rear section of said chassis frame.

11. The vehicle of claim 10, wherein said landing section includes an access platform section for removably receiving a platform step insert.

12. The vehicle of claim 11, wherein said platform step insert is selected from a platform step, a fixed ramp, and an actuating extension ramp.

13. A frame insert for a passenger transport vehicle, wherein the passenger transport vehicle includes a chassis comprising a front axle, a rear axle, and a frame that supports the front axle and the rear axle, said frame insert comprising:
a longitudinally-extending left rail and a longitudinally-extending right rail, wherein said left rail and said right rail are spaced apart and extend in generally parallel relationship;
one or more lateral cross members extending between said left rail and said right rail;
a reinforcement assembly positioned at a rear end of each of said left rail and said right rail, wherein said reinforcement assemblies are configured to be at least partially received in channels presented by the chassis frame; and
an extended drop section extending forward from said right rail, wherein said extended drop section is positioned lower than said right rail.

14. The frame insert of claim 13, wherein said reinforcement assemblies each comprises a pair of vertically-extending tubes connected by a horizontally-extending tube, such that each of said reinforcement assemblies is configured in an H shape.

15. The frame insert of claim 14, wherein said reinforcement assemblies are secured in place with respect to said right and left rails via weld and/or one or more gusset plates.

16. The frame insert of claim 13, wherein said extended drop section is secured in place with respect to said right rail via weld and/or one or more gusset plates.

17. The frame insert of claim 13, wherein a said extended drop section is positioned lower than said right rail, such that a top surface of said extended drop section is approximately 4 inches lower than a top surface of said right rail.

18. A method for modifying an original equipment manufacturer (OEM) vehicle from a high-profile configuration to a low-profile configuration, wherein said OEM vehicle comprises an OEM chassis that includes a front axle, a rear axle, and an OEM frame that supports the front axle and the rear axle, wherein the OEM frame includes an OEM left rail and an OEM right rail, said method comprising the steps of:
(a) cutting the OEM right rail (i) rearward of the front axle of the vehicle chassis and (ii) forward of the rear axle of the vehicle chassis, wherein said cuts are formed such that a central section of the OEM right rail is removable from remaining portions of the OEM frame;
(b) cutting the OEM left rail (i) rearward of the front axle of the vehicle chassis and (ii) forward of the rear axle of the vehicle chassis, wherein said cuts are formed such that a central section of the OEM left rail is removable from remaining portions of the OEM frame;
(c) engaging a drop frame insert with the remaining portions of the OEM frame, wherein the drop frame insert extends between the front axle and the rear axle of the vehicle;
(d) rigidly securing the drop frame insert in place with respect to the remaining portions of the OEM frame,
wherein upon said rigidly securing of step (d), at least a portion of a top surface of the drop frame insert is positioned lower than a top surface of the OEM frame, and wherein at least a portion of a bottom surface of the drop frame insert is generally coplanar with a bottom surface of the OEM frame.

19. The method of claim 18, wherein prior to said engaging of step (c), said method includes the step of: removing fasteners used to secure a spring hanger to each of the OEM left rail and the OEM right rail and removing the spring hangers from the OEM left rail and the OEM right rail.

20. The method of claim 19, wherein upon removing spring hangers from each of the OEM left rail and the OEM right rail, said rigidly securing of step (d) is performed by securing a portion of the drop frame insert using the fasteners used to secure the spring hangers to the OEM left rail and the OEM right rail.

* * * * *